Oct. 7, 1930.  F. D. WARNER  1,777,685
PARACHUTE DEFLATER
Filed Jan. 31, 1929
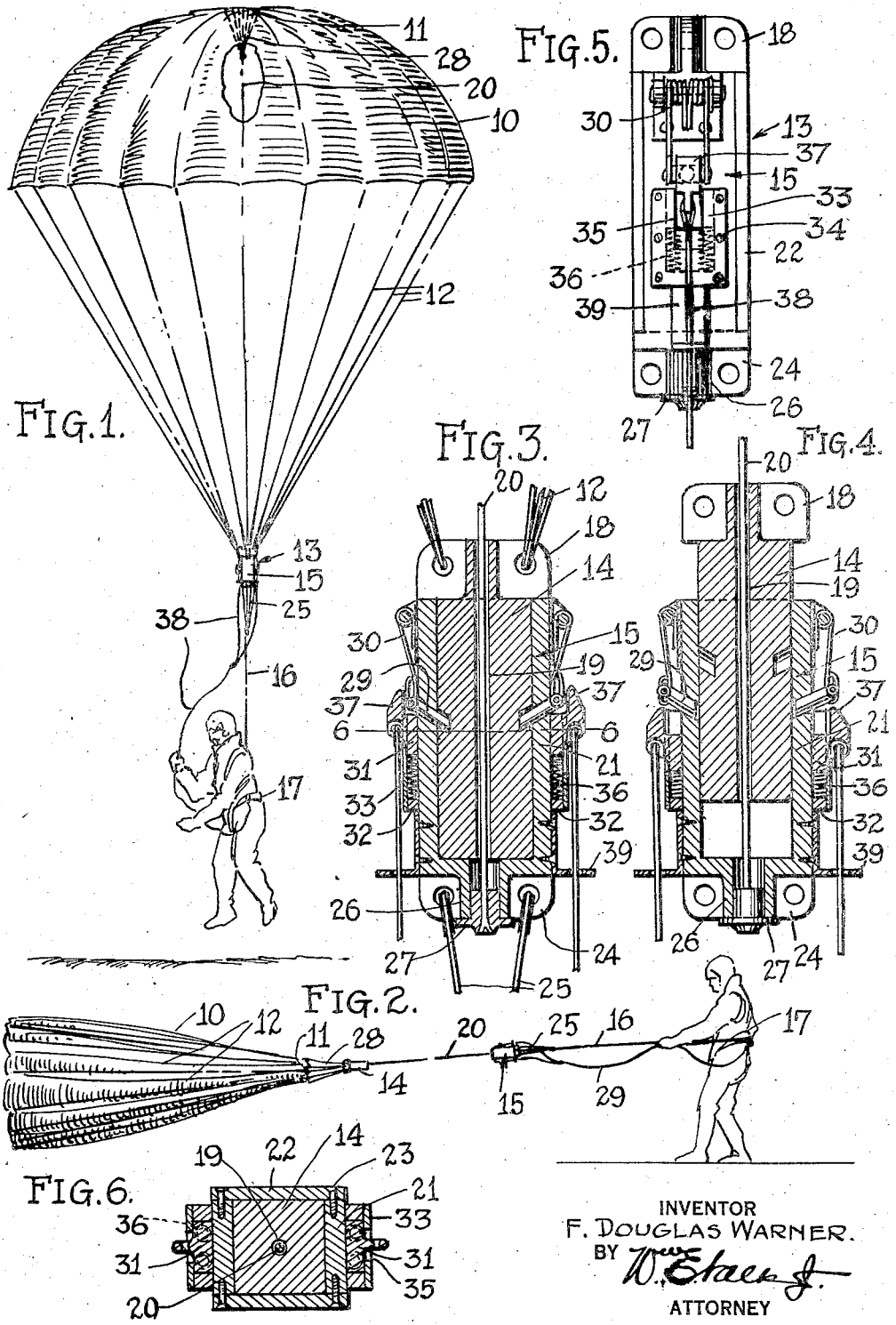
INVENTOR
F. DOUGLAS WARNER.
BY
ATTORNEY Patented Oct. 7, 1930

1,777,685

UNITED STATES PATENT OFFICE

FREDERICK DOUGLAS WARNER, OF MIDDLETOWN, NEW YORK

PARACHUTE DEFLATER

Application filed January 31, 1929. Serial No. 336,343.

My invention relates to parachutes, either man or plane carrying, and more particularly to a novel manually controlled means for quickly deflating the parachute after a landing is made.

Where the conventional type parachute is used, a certain amount of ground drag is encountered, after landing, due to the fact that the then inflated parachute is subject to the vagaries of the wind. Frequently therefore the attached parachute load, be it man or plane, is seriously injured by and as a result of such drag.

The principal object of the present invention is to eliminate all drag, after landing, by means of a so-called "deflater". In its preferred embodiment said deflater comprises a part connected to the shroud lines of the parachute and a part connected to the load line thereof. These two parts are releasably fastened together and remain so fastened during the full period of the parachute descent. The release means is preferably spring operated and subject to manual control. When released, thru the relative movement of the deflater parts, the parachute is instantly turned in-side-out and hence completely collapsed or deflated. All danger of ground drag is thus avoided and the parachute, at the same time, rendered manageable from the moment deflection occurs. The deflater, moreover, is simple and positive in operation, is light, strong and compact, and can be, in view of its simplicity, manufactured at small cost and neatly and quickly packed, along with the parachute, ready for instant use.

Other objects and advantages of the invention will be hereinafter set forth.

In the drawings:

Fig. 1 is a side elevation of a descending parachute;

Fig. 2 is a similar view showing the parachute deflated after the landing is made;

Fig. 3 is a longitudinal vertical sectional view of the deflater;

Fig. 4 is a view similar to Fig. 3 showing the deflater parts released;

Fig. 5 is a side elevation of the deflater, and

Fig. 6 is a section on the line 6—6 of Fig. 3.

In the embodiment of the invention selected for illustration, a parachute of more or less conventional design is shown. It comprises the envelope or parachute proper 10, having formed therein, at its apex, an air escape vent or opening 11. At intervals of space around its periphery said parachute 10 has attached thereto the usual shroud lines 12, which shroud lines converge downwardly (when the parachute is inflated) and are fastened to the so-called deflater, designated in its entirety as 13. The deflater 13 (see Figs. 3 to 6, inclusive) includes, in addition to the part 14 to which the shroud lines are fastened, an interlocking or complementary part 15. To said last mentioned part the load line 16 is fastened. If the parachute is a man carrying parachute, then said load line is fastened at its opposite end to the body harness 17. If it is a plane carrying parachute, then said load line has fastened thereto the plane (not shown). The operation, regardless of the use to which the parachute it put, is in each instance exactly the same.

The parts 14 and 15 which comprise the deflator are preferably formed so as to telescopically engage one within the other. To this end the part 14 is of piston-like construction, preferably polygonal in section, and provided at one end with radially disposed eyed flanges 18 to which the shroud lines 12 are fastened. Centrally, there is formed in said part 14, a longitudinally extending bore or passageway 19 thru which a flexible connection 20, extending from the part 15 to the parachute 10, is carried. The purpose of such connection is to prevent the loss of the parachute, when deflated, as well as to act as a guide along which the part 14 slides, when released.

The part 15, unlike the part 14, is of tubular construction, i. e., it is shaped in cross-section to receive and retain the piston-like part or plunger 14 therein. In its preferred embodiment, said part 15 comprises a substantially U-shaped member 21 having removable side plates 22 fastened to its opposite sides or edges as indicated at 23. At its closed end said part 15 has formed thereon radially disposed eyed flanges 24 to which the multiple strands 25 of the load line 16 are fastened. With said parts 14 and 15 interlocked, said flanges 18 and 24 extend out from the opposite ends of the deflater, and the deflater itself accordingly serves as a breakable connection.

To admit of the firm anchorage of the flexible connection 20 to said part 15, the member 21 has formed thereon at its flanged end a cylindrical extension 26 within the hollow of which said connection 20 is anchored. The means for anchoring said connection consists of a plug 27 shaped to fit said extension. Said connection at its opposite end is spread as at 28 and fastened to a ring (not shown) which encircles the air escape opening 11 in the parachute. Thus extended, such connection affords a flexible guide for the part 14 in its outward sliding movement, which apart, under the influence of the pressure exerted on the then inflated and released parachute, rides along said connection, slacking the shroud lines 12 as it moves, until, as illustrated in Fig. 2, said parachute is turned, as it were, completely inside out. Once collapsed or deflated, the parachute becomes manageable and all possibility of ground drag is overcome. Moreover, as intimated, said connection 20 prevents the collapsed parachute from getting away.

The lock mechanism by which the parts 14 and 15 are releasably fastened together comprises opposed locking dogs 29, each set at a corresponding tho opposite angle and mounted, one each at opposite sides of the member 21 to extend therethru and into firm locking engagement with that part 14 of the deflater to which the shroud lines are attached. Each locking dog has fastened thereto a release spring 30 by means of which the locking engagement of the dogs 29 with said part 14 is broken immediately said dogs are released. Preferably said springs 30 are fastened to the part 15 and are arranged to exert, at all times, an outward pull on the dogs 29.

To counteract the urge of the springs 30 and at the same time lock the dogs 29 against outward movement, slides 31 are provided. These slides 31 are held in place by U-shaped brackets 32 and cover plates 33 fastened to the member 21 by screws 34. Together, said brackets and cover plates, the latter being cut away as at 35, afford guides for said slides 31, as well as pockets within which springs 36 are seated. The purpose of the springs 36 is to urge the slides 31 in an upward direction. As each slide 31 is provided with an enlarged or outwardly extending head portion 37, the purpose of the cut away in each plate 33 is obvious. In the locked position of the parts 14 and 15 the locking dogs bear on said enlargements 37, and said enlargements, when the dogs are released work within said cut outs. It is to said enlargements 37 that the release cord or cable 38 is fastened. Preferably said cord or cable is divided at one end and fastened to said slides, whereas, at its opposite end, and regardless of the length of the load line, it is carried to a point within easy and convenient reach of the operator. Obviously, therefore, after landing, the operator, by exerting a pull on said release cord 28, may simultaneously release both locking dogs 29. When released, the action of the wind or air on the then inflated parachute will immediately withdraw the part 14 from its engagement within the part 15, said part 14, in its movement, sliding along the connection 20 until stopped by contact with the strands 28. The parachute, meanwhile, is turned completely inside out. If desired, brackets 39 may be provided, one each at opposite sides of the member 21 to guide the separate strands at the outer end of the release cord or cable 29.

While I have described my invention in detail in its present prefered embodiment, it will be obvious to those skilled in the art after understanding my invention, that various changes and modifications may be made therein without departing from the spirit or scope thereof. I aim in the appended claims to cover all such modifications and changes.

What is claimed is:

1. In a parachute, a device comprising separable parts to which the load line of the parachute and all shroud lines thereof are respectively fastened, and means for simultaneously slacking all shroud lines and completely deflating the parachute by releasing that part of the device to which all shroud lines are fastened.

2. In a parachute, a device comprising separable parts to which the load line of the parachute and all shroud lines thereof are respectively fastened, means for slacking all shroud lines and completely deflating the parachute by releasing that part of said device to which all shroud lines are fastened, and a tie connection between said load line and said parachute for holding said parachute when deflated.

3. In a parachute, a device comprising separable parts to which the load line of the parachute and the shroud lines thereof are respectively fastened, means for slacking the shroud lines and deflating the parachute by releasing that part of said device to which said shroud lines are fastened, and a tie connection between said load line and said parachute along which said released part is adapted to slide.

4. In a parachute, a device comprising separable parts to which the load line of the parachute and the shroud lines thereof are respectively fastened, a tie connection between said load line and said parachute along which that part of said device to which said shroud lines are fastened is adapted to slide when released, and release means manually operable to break the connection between said separable device parts.

5. In a parachute, a device comprising separable parts to which the load line of the parachute and the shroud lines thereof are respectively fastened, a tie connection between said load line and substantially the geometrical center of the parachute along which that part of said device to which the shroud lines are fastened is adapted to slide when released, and release means manually operable to break the connection between said separable device parts.

6. In a parachute, a device comprising releasably connected telescopically engaging parts to which the load line of the parachute and the shroud lines thereof are respectively fastened, and means for breaking said connection and slacking said shroud lines to deflate the parachute by the sliding movement of one said part out of telescopic engagement with the other.

7. In a parachute, a device comprising separable parts to which the load line of the parachute and the shroud lines thereof are respectively fastened, one said part, when released, being relatively movable to slack said shroud lines and deflate the parachute, a spring lock connection between said parts, and a manually operable release means for breaking said lock connection.

8. In a parachute, a device comprising interlocking parts to which the load line of the parachute and all shroud lines thereof are respectively fastened, and a release means operable to break said interlock and slack said shroud lines to completely deflate said parachute.

9. In a parachute, a device comprising a part to which the shroud lines of the parachute are fastened and a part to which the load line thereof is fastened, said two parts being designed for locking engagement one within the other, and one said part, when released, being movable under the influence of the then inflated parachute to slack said shroud lines and deflate the parachute, and means to release said engaging parts at will.

10. In a parachute, a part to which the load line of the parachute is fastened, a part to which the shroud lines of the parachute are fastened, said two parts being adapted to engage one within the other, spring dogs carried by one said part to lock said parts together, one said part, when released, being movable to slack said shroud lines and deflate the parachute, and means operable to release said dogs and break said lock connection.

11. In a parachute, a part to which the load line of the parachute is fastened, a part to which the shroud lines of the parachute are fastened, said two parts being adapted to interlock, spring dogs carried by one said part to lock said parts together, one said part, when released, being movable to slack said shroud lines and deflate said parachute, a connection between said load line and the parachute along which said released part is adapted to slide as the parachute is deflated, and means operable to manually release said dogs and break said lock connection.

In testimony whereof I hereunto affix my signature.

F. DOUGLAS WARNER.